United States Patent
Sakuma et al.

(10) Patent No.: US 11,110,430 B2
(45) Date of Patent: Sep. 7, 2021

(54) TREATMENT METHOD OF RADIOACTIVE IODINE-CONTAINING FLUID

(71) Applicants: EBARA CORPORATION, Tokyo (JP); TOSOH CORPORATION, Yamaguchi (JP)

(72) Inventors: Takashi Sakuma, Tokyo (JP); Makoto Komatsu, Tokyo (JP); Takeshi Izumi, Tokyo (JP); Keisuke Tokunaga, Yamaguchi (JP); Shigeru Hirano, Yamaguchi (JP)

(73) Assignees: EBARA CORPORATION, Tokyo (JP); TOSOH CORPORATION, Yamaguchi (JP)

( * ) Notice: Subject to any disclaimer, the term of this patent is extended or adjusted under 35 U.S.C. 154(b) by 259 days.

(21) Appl. No.: 16/079,177

(22) PCT Filed: Feb. 23, 2017

(86) PCT No.: PCT/JP2017/006750
§ 371 (c)(1),
(2) Date: Aug. 23, 2018

(87) PCT Pub. No.: WO2017/146130
PCT Pub. Date: Aug. 31, 2017

(65) Prior Publication Data
US 2019/0060864 A1    Feb. 28, 2019

(30) Foreign Application Priority Data

Feb. 26, 2016    (JP) .............................. JP2016-035352

(51) Int. Cl.
*B01D 53/02*    (2006.01)
*B01J 20/18*    (2006.01)
*C01B 39/22*    (2006.01)
*G21F 9/02*    (2006.01)
*G21F 9/12*    (2006.01)
*C01B 39/18*    (2006.01)
*B01J 20/28*    (2006.01)
*B01J 20/30*    (2006.01)
*B01D 53/04*    (2006.01)
*C01B 39/14*    (2006.01)

(52) U.S. Cl.
CPC .............. *B01J 20/18* (2013.01); *B01D 53/04* (2013.01); *B01J 20/28* (2013.01); *B01J 20/28004* (2013.01); *B01J 20/28016* (2013.01); *B01J 20/3007* (2013.01); *C01B 39/14* (2013.01); *C01B 39/18* (2013.01); *C01B 39/22* (2013.01); *G21F 9/02* (2013.01); *G21F 9/12* (2013.01); *B01D 2253/108* (2013.01); *B01D 2257/202* (2013.01); *C01P 2004/03* (2013.01); *C01P 2004/61* (2013.01)

(58) Field of Classification Search
CPC ........ B01D 2253/108; B01D 2257/202; B01D 53/04; B01J 20/18; B01J 20/28; B01J 20/28004; B01J 20/28016; B01J 20/3007; C01B 39/14; C01B 39/18; C01B 39/22; G21F 9/02; G21F 9/12; C01P 2204/03; C01P 2204/61
See application file for complete search history.

(56) References Cited

U.S. PATENT DOCUMENTS

| | | | |
|---|---|---|---|
| 4,735,786 A | 4/1988 | Inoue et al. | |
| 4,913,850 A | 4/1990 | Puppe et al. | |
| 5,075,084 A | 12/1991 | Wilhelm et al. | |
| 5,098,448 A | 3/1992 | Puppe et al. | |
| 6,506,935 B1* | 1/2003 | Kulprathipanja | C07B 63/00 562/606 |
| 2014/0048489 A1* | 2/2014 | Hirai | C02F 1/42 210/683 |
| 2016/0247588 A1 | 8/2016 | Kobayashi et al. | |

FOREIGN PATENT DOCUMENTS

| | | |
|---|---|---|
| EP | 0 608 057 A1 | 1/1994 |
| JP | H60-225638 A | 11/1985 |
| JP | H06-183725 A | 7/1994 |
| JP | H06-214095 A | 8/1994 |
| JP | 3647667 B2 | 5/2005 |
| JP | 2012-233749 A | 11/2012 |
| JP | 2013-104727 A | 5/2013 |
| JP | 5504368 B1 | 5/2014 |
| JP | 2015-081841 A | 4/2015 |

OTHER PUBLICATIONS

International Search Report issued in Patent Application No. PCT/JP2017/006750 dated May 23, 2017.
Written Opinion issued in Patent Application No. PCT/JP2017/006750 dated May 23, 2017.
Extended European Search Report issued in Patent Application No. EP 17 75 6568 dated Sep. 25, 2019.

\* cited by examiner

*Primary Examiner* — Christopher P Jones
(74) *Attorney, Agent, or Firm* — Pearne & Gordon LLP

(57) ABSTRACT

The present invention provides a treatment method of a radioactive iodine-containing fluid, comprising passing the radioactive iodine-containing fluid through an adsorbent for iodine consisting of a silver-containing binderless zeolite molded body having a silver content of 50 mass % or less, to adsorb the radioactive iodine on the adsorbent for iodine.

4 Claims, 7 Drawing Sheets

TREATMENT METHOD OF RADIOACTIVE IODINE-CONTAINING FLUID

TECHNICAL FIELD

The present invention relates to a treatment method of a radioactive iodine-containing fluid, in particular, a treatment method of a radioactive fluid for removing radioactive iodine from the radioactive fluid containing contaminating ions which originate from the seawater, for example, used as cooling water in a nuclear power plant.

BACKGROUND ART

A large amount of radioactive waste water containing radioactive iodine has been generated by the accident caused by the Great East Japan Earthquake on Mar. 11, 2011, in the Fukushima Daiichi Nuclear Power Station. The radioactive waste water includes: the contaminated water generated due to the cooling water poured into a reactor pressure vessel, a reactor containment vessel, and a spent fuel pool; the trench water accumulated in a trench; the subdrain water pumped up from a well called a subdrain in the periphery of a reactor building; groundwater; and seawater (hereinafter, referred to as "radioactive waste water"). Radioactive substances are removed from these radioactive waste waters by using a treatment apparatus called, for example, SARRY (Simplified Active Water Retrieve and Recovery System (a simple type contaminated water treatment system for removing cesium) or ALPS (Advanced Liquid Processing System (a multi-nuclide removal apparatus)), and the water thus treated is collected in a tank. Among radioactive substances, radioactive iodine present mainly in a form of iodide ion or in a form of iodate ion in contaminated water accounts for much of radioactive iodine. Examples of a substance capable of selectively adsorbing and removing radioactive iodine include silver supported on activated carbon and silver supported on inorganic substances. For example, in ALPS, silver supported on activated carbon is used as an adsorbent, and radioactive iodine is removed.

As an adsorbent for iodine, there have been proposed a capturing agent for iodine ion prepared by supporting silver or palladium on alumina or zeolite as a support (PTL 1 and PTL 2); an iodine removing filter prepared by supporting silver on a side chain grown by radiation graft polymerization on a polymer base material (PTL 3); an adsorbent for radioactive iodine which adsorbs iodine from vapor, has fine pores adapted to the size of a hydrogen molecule by substituting ion exchange sites with silver, and is prepared by granulating an X-type zeolite powder (PTL 4), etc. A method has also been proposed for removing iodine from vapor by using molecular sieve granules containing both of an X-type zeolite substituted with silver and an A-type zeolite substituted with silver (PTL 5).

However, conventional silver supported on activated carbon, silver supported on inorganic substances and the like allow silver particles to be physically impregnated, and therefore cannot support large amounts of silver particles. The filter of a polymer base material has a small amount of silver supported per volume, and a large number of filters are required for treating a large amount of radioactive waste water. Moreover, conventional zeolite molded bodies are limited in the amount of silver supported because it contains 10 mass % to 30 mass % of a binder based on the total mass of the base material. The adsorbent for radioactive iodine disclosed in PTL 4 and the molecular sieve granules disclosed in PTL 5 contain large amounts of silver clusters not contributing to the adsorption of iodine because silver is aggregated and not dispersed upon preparing.

Because the iodine adsorption property depends on the amount of silver supported, a large amount of an adsorbent for iodine is required when a large amount of waste water is treated, in contrast to when iodine in vapor or gas is adsorbed, and thus there is a new problem that the broken-through adsorbent is generated as a secondary waste in a large amount.

CITATION LIST

Patent Literature

PTL 1: Japanese Patent Laid-Open No. 2013-104727
PTL 2: Japanese Patent Laid-Open No. 2012-233749
PTL 3: Japanese Patent No. 3647667
PTL 4: Japanese Patent No. 5504368
PTL 5: U.S. Pat. No. 4,913,850

SUMMARY OF INVENTION

Technical Problem

An object of the present invention is to provide a treatment method of radioactive waste water, capable of reducing the amount of secondary waste to be generated. In particular, an object of the present invention is to provide a method for efficiently adsorbing and removing radioactive iodine from a large amount of radioactive waste water containing, in addition to iodide ions, as concomitant ions, high concentrations of chloride ions, cesium ions, strontium ions, magnesium ions, calcium ions, and sodium ions.

In addition, an object of the present invention is to provide a method for efficiently adsorbing and removing radioactive iodine, not only from radioactive waste water, but from gas containing radioactive iodine.

Accordingly, an object of the present invention is to provide a method for efficiently adsorbing and removing radioactive iodine from a radioactive fluid including radioactive waste water or a radioactive gas.

Solution to Problem

The present invention provides a treatment method of a large amount of a radioactive fluid containing, in addition to iodide ions, as concomitant ions, high concentrations of chloride ions, cesium ions, strontium ions, magnesium ions, calcium ions, and sodium ions, by using an adsorbent for iodine having a high iodine adsorbing performance per unit volume. The specific aspects of the present invention are as follows.

[1] A treatment method of a radioactive iodine-containing fluid, comprising passing the radioactive iodine-containing fluid through an adsorbent for iodine composed of a silver-containing binderless zeolite molded body having a silver content of 50 mass % or less, to adsorb the radioactive iodine on the adsorbent for iodine.

[2] The treatment method of a radioactive iodine-containing fluid according to [1], wherein the adsorbent for iodine is composed of a silver-containing binderless zeolite molded body containing 5 mass % or more of silver ions.

[3] The treatment method of a radioactive iodine-containing fluid according to [1] or [2], wherein the binderless zeolite molded body is either a binderless A-type zeolite molded body or a binderless X-type zeolite molded body.

[4] The treatment method of a radioactive iodine-containing fluid according to any one of [1] to [3], wherein the radioactive iodine-containing fluid is a liquid, and the adsorbent for iodine is in a particle form having a particle size falling within a range from 30 μm to 1500 μm.

[5] The treatment method of a radioactive iodine-containing fluid according to any one of [1] to [3], wherein the radioactive iodine-containing fluid is a gas, and the adsorbent for iodine is in a particle form having a particle size falling within a range from 800 μm to 2000 μm.

Advantageous Effects of Invention

The adsorbent for iodine of the present invention is composed of a silver-containing binderless zeolite molded body in which a silver content is high, and silver is supported in an uniformly dispersed state without being aggregated, is high in the adsorption performance of iodine per unit volume, and is capable of inexpensively adsorbing and removing the radioactive iodine contained in a fluid such as radioactive waste water or a radioactive waste gas.

DESCRIPTION OF EMBODIMENTS

Figure 1:
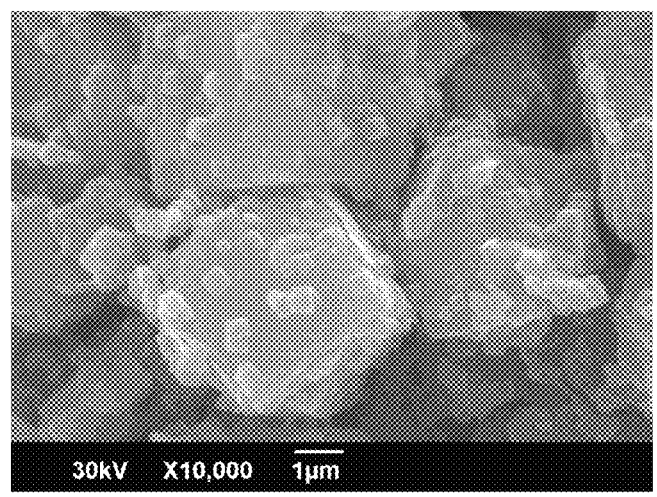
FIG. 1 is a SEM image of the silver-containing A-type zeolite molded body prepared in Example 1, at a magnification of 10,000.

Hereinafter, the present invention is described with reference to the accompanying drawings, but the present invention is not limited to these.

The adsorbent for iodine used in the treatment method of fluid of the present invention is a silver-containing binderless zeolite molded body having a silver content of 50 mass % or less. The binderless zeolite molded body is a product prepared by solidifying zeolite fine particles and a zeolite powder into a certain shape without using any binder. The binderless zeolite molded body usable in the present invention has the zeolite purity of 90% or more, preferably 95% or more and more preferably 97% or more.

In the silver-containing zeolite molded body, the molar ratio of 1 mol of silicon (Si) to 2 mol of aluminum (Al) (hereinafter, referred to as "the molar ratio $Si/Al_2$") is 2.0 or more and 3.0 or less. This provides a suitable number of the sites of Al that are the coordination sites of the silver ion, so as to allow silver to be highly dispersed. The molar ratio $Si/Al_2$ is preferably 2.2 or more, further preferably 2.4 or more, and furthermore preferably 2.6 or more. This suppresses the aggregation of silver more. In addition, the molar ratio $Si/Al_2$ is 3.0 or less. This increases the number of the sites of Al more, and silver is more highly dispersed.

The silver-containing zeolite molded body preferably includes an alkali metal. By performing the ion exchange with the alkali metal, silver ions can be more uniformly dispersed. Here, the alkali metal is at least one selected from the group consisting of lithium (Li), sodium (Na), potassium (K), rubidium (Rb) and cesium (Cs). The silver-containing zeolite molded body preferably includes Na.

In the silver-containing zeolite molded body, the molar ratio of the sum of the alkali metal and silver to Al (hereinafter, referred to as "the molar ratio (alkali metal+ Ag)/Al") is 0.9 or more and 1.1 or less.

In the silver-containing zeolite molded body, the total content of $SiO_2$, $Al_2O_3$, $Ag_2O$, and the alkali metal oxides is 90 mass % or more, preferably 95 mass % or more, further preferably 97 mass % or more, and more preferably 98 mass % or more. This provides a zeolite molded body in which the component other than zeolite, allowing silver to be easily aggregated, is small in amount, and silver is highly dispersed. Here, the amounts of Ag and the alkali metal in the silver-containing zeolite molded body are represented in terms of the mass of oxides, for example, heated at 900° C.

The crystal structure of the silver-containing zeolite molded body is preferably at least either the A type or the FAU type, and further preferably a FAU-type zeolite. The pore size of the FAU-type zeolite is a large pore size as 8 Å or more and 15 Å or less, and accordingly the aggregation of silver is more suppressed. The FAU-type zeolite may include a X-type zeolite and the Y-type zeolite. The crystal structure of the silver-containing zeolite molded body can be detected by powder X-ray diffraction measurement.

The silver-containing zeolite molded body includes not only the zeolite powder but also the zeolite converted from the inorganic binder. In other words, silver-containing zeolite molded body includes the zeolite fine particles described below.

The zeolite powder may have a larger average particle size than the zeolite fine particles described below. The average particle size of the zeolite powder is preferably 2 μm or more and 8 μm or less, and further preferably 3 μm or more and 6 μm or less. This improves the strength of the silver-containing zeolite molded body.

Here, the average particle size of the zeolite powder is an average particle size determined by randomly extracting 30 or more of independent particles that are identifiable in a scanning electron microscope (SEM) image at a measurement magnification of 1,500 to 3,000.

In the silver-containing zeolite molded body, the zeolite purity before supporting silver is 90% or more, preferably 95% or more, and further preferably 97% or more. Here, the zeolite purity can be calculated by a common measurement of an amount of moisture adsorption. In other words, from the ratio of the amount of moisture adsorbed per 100 g of a zeolite molded body before supporting silver to the amount of moisture adsorbed per 100 g of zeolite powder, the zeolite purity can be calculated by using the following formula (1):

[Formula 1]

$$\text{Zeolite purity} = \text{An amount of moisture adsorbed by zeolite molded body before supporting silver/an amount of moisture adsorbed by zeolite powder} \times 100 \quad (1)$$

For example, the zeolite purity of the molded body including the X-type zeolite powder can be calculated from the following formula (2):

[Formula 2]

$$\text{Zeolite purity} = \text{An amount of moisture adsorbed by } X\text{-type zeolite molded body before supporting silver/an amount of moisture adsorbed by } X\text{-type zeolite powder} \times 100 \quad (2)$$

A zeolite molded body having a high zeolite purity of 90% or more (hereinafter, also referred to as "the binderless molded body") is obtained by converting the inorganic binder in the molded body into zeolite. In other words, the silver-containing zeolite molded body contains an inorganic binder converted into zeolite. Usually, when an inorganic binder is converted into zeolite, zeolite fine particles are produced, and are present on the surface of the zeolite powder. The zeolite fine particles perform as the binder to mutually bind the zeolite powders, and accordingly the mechanical strength of the silver-containing zeolite molded body is increased. In other words, the strength of the molded body containing no zeolite fine particles and having a zeolite purity less than 90% (hereinafter, also referred to as "the binder molded body") is substantially low. Usually, a zeolite molded body is obtained by molding a mixture of a zeolite powder and an inorganic binder; however, in the case of a mixture including 90 mass % or more of zeolite powder, the plasticity required for molding cannot be obtained, and it is extremely difficult to form a molded body having a certain shape. Accordingly, the silver-containing zeolite molded body preferably includes a zeolite powder and zeolite fine particles.

The average particle size of the zeolite fine particles is preferably 0.2 μm or more and 1.5 μm or less.

Here, the average particle size of the zeolite fine particles is an average particle size determined by randomly extracting 30 or more of independent smallest unit of particles having a particle size of 1.5 μm or less, that are identifiable in a SEM image at a measurement magnification of 10,000 to 15,000.

The fact that the zeolite powder has on the surface thereof the zeolite fine particles can be verified from a SEM image. In other words, the fact that the zeolite powder has on the surface thereof the zeolite fine particles can be qualitatively verified from the SEM image.

The fact that the zeolite powder has on the surface thereof the zeolite fine particles can also be verified from the volumetric particle size distribution. In other words, from the fact that the volumetric particle size distribution of the pulverized silver-containing zeolite molded body has a monomodal peak, and the average particle size based on the volumetric distribution (D50) is comparable with zeolite powder, namely, the volumetric particle size distribution has no peak corresponding to the average particle size of the zeolite fine particles, it is possible to verify that the zeolite powder and the zeolite fine particles are integrated, and the zeolite powder has on the surface thereof the zeolite fine particles.

It is to be noted that the fact that the zeolite molded body has a high zeolite purity can be verified by XRD. Namely, in the obtained XRD pattern, only the diffraction peaks corresponding to the zeolite structure can be observed. When the zeolite purity described above is not satisfied, and an impurity, for example, an inorganic binder is contained in a large content, the diffraction peaks originating from the inorganic binder are observed.

In the silver-containing zeolite molded body, the zeolite fine particles also act as a binder. Therefore, the silver-containing zeolite molded body is excellent in mechanical strength. The compression strength of the silver-containing zeolite molded body is, for example, in a columnar molded body of 1.5 mm in diameter and 5 mm in average length, usually 15 N or more, preferably 30 N or more and further preferably 40 N or more.

The silver-containing zeolite molded body contains more than 0 mass %, preferably 5 mass % or more, more preferably 8 mass % or more, further preferably 11 mass % or more, and particularly preferably 16 mass % or more, and 50 mass % or less, preferably 46 mass % or less, further preferably less than 36 mass %, further preferably 35.5 mass % or less, more preferably 35 mass % or less, further preferably 32 mass % or less, further preferably 30 mass % or less, particularly preferably 25 mass % or less, and more preferably 20 mass % or less, of silver based on the total mass of the molded body. The silver can take forms of silver ions present in a dispersed state, silver clusters present in an aggregated state, and metal silver; silver ions exhibit high iodine adsorption performance, and the iodine adsorption performances of the silver clusters and the metal silver are low. When the silver content in the silver-containing zeolite molded body is 36 mass % or more, the aggregation of silver is remarkable, leading to increased amounts of the silver clusters in an aggregated state and metal silver. Metal silver not only blocks the pores of the zeolite, but also easily desorbs from the zeolite molded body, and the iodine adsorption performance of the zeolite molded body per unit mass of silver is degraded. Moreover, the increase of the content of silver increases the production cost, and thus increases the running cost of the waste water treatment, thereby not practical.

The silver-containing zeolite molded body as an adsorbent for iodine preferably has a large content of the silver ions in a dispersed state, and preferably has a small content of the silver clusters in an aggregated state and a small content of metal silver. The content of the silver ions in the silver-containing zeolite molded body is 5 mass % or more, preferably 8 mass % or more, and further preferably 11 mass % or more. As a large amount of silver ions are contained, the iodine adsorption performance is enhanced; however, from the viewpoint of the cost performance, it is desirable that the content of the silver ions is less than 36 mass %, preferably 30 mass % or less, further preferably 26 mass % or less, further preferably 19 mass % or less, and particularly preferably 14 mass % or less. On the other hand, the content of the silver clusters and the metal silver is preferably small, and is desirably, in the total amount of silver in the silver-containing zeolite molded body, 70 mass % or less, preferably 50 mass % or less, further preferably 45 mass % or less, more preferably 43 mass % or less, and particularly preferably 34 mass % or less. In addition, desirably, the content of the silver clusters in the silver-containing zeolite molded body is preferably 22 mass % or less, further preferably 12 mass % or less, further preferably 11 mass % or less, more preferably 8.5 mass % or less, and particularly preferably 7 mass % or less; and the content of the metal silver in the silver-containing zeolite molded body is preferably 2.5 mass % or less, further preferably 1.4 mass % or less, further preferably 1.1 mass %, more preferably 1.0 mass % or less, and particularly preferably 0.8 mass % or less.

The contents of respective silver species in the silver-containing zeolite molded body can be determined by the UV-VIS (ultraviolet-visible spectrometry) measurement. In the UV-VIS pattern after waveform separation, a peak having a peak top at a wavelength of 210 nm or more and 240 nm or less is identified as a specific peak of the silver ion, a peak having a peak top at a wavelength of more than 240 nm and 350 nm or less is identified as a specific peak of the silver cluster, and a peak having a peak top at a wavelength of more than 350 nm and 700 nm or less is identified as a specific peak of the metal silver. From the peak areas of the respective peaks, the proportions of the silver ion, silver cluster and metal silver are calculated, and by multiplying the total silver content in the silver-containing zeolite molded body by the proportions of respective silver species, the contents of respective silver species can be calculated.

The silver-containing zeolite molded body as an adsorbent for iodine is preferably a porous body having a BET specific surface area of 560 m$^2$/g or more, preferably 600 m$^2$/g or more, more preferably 700 m$^2$/g or more, and 900 m$^2$/g or less, preferably 850 m$^2$/g or less, more preferably 750 m$^2$/g or less. By setting the BET specific surface area to be 560 m$^2$/g or more, the aggregation of silver can be suppressed, and the proportion of the silver ions high in activity is increased.

The shape of the silver-containing zeolite molded body is preferably at least one selected from the group consisting of discoid, columnar, hollow, polyhedral, spherical, nearly spherical, trifoliate and clumpy shapes, further preferably at least one selected from the group consisting of columnar, spherical and trifoliate shapes, and particularly preferably a columnar shape.

The silver-containing zeolite molded body is in a particle form having a particle size falling in a range from 30 μm to 1500 μm, preferably from 300 μm to 800 μm, and more preferably from 300 μm to 600 μm. The silver-containing zeolite molded body has a finer particle size and a higher adsorption rate as compared with commercially available common adsorbents (for example, zeolite-based adsorbents are pellets having a particle size of approximately 1.5 mm). On the other hand, when a radioactive iodine-containing waste water is treated, a powdery adsorbent is poor in workability in such a way dust swirls in the air. Thus, the adsorbent is preferably molded so as to have a predetermined particle size.

The silver-containing zeolite molded body can be produced as follows: a binderless zeolite molded body is immersed in a silver nitrate aqueous solution to conduct an ion exchange treatment, and then the molded body is washed with pure water and dried to produce the silver-containing zeolite molded body. The silver content in the silver-containing zeolite molded body can be controlled by regulating the concentration of the silver nitrate aqueous solution. In order to obtain a silver-containing zeolite molded body having a silver content of 50 mass % or less, a silver nitrate aqueous solution having an any suitable concentration may be used; however, from the viewpoint of the ion exchange efficiency and the production cost, a silver nitrate aqueous solution having a concentration of 0.1 mass % or more and 30 mass % or less, which is calculated in terms of silver nitrate, is preferably used. By using a silver nitrate aqueous solution, it is possible to increase the proportion of the silver ions, and to decrease the proportions of the silver clusters and metal silver.

In order to allow the zeolite molded body to efficiently support silver, the mass ratio of the silver nitrate aqueous solution to the binderless zeolite molded body is preferably set to be 3 or more and 10 or less.

EXAMPLES

Hereinafter, the present invention is described more specifically by way of Examples. However, the present invention is not limited to Examples.

<Measurement of Amount of Moisture Adsorbed by Adsorbent>

As a pretreatment, a zeolite powder or a zeolite molded body (hereinafter, also simply referred to as "sample") was dried in the atmosphere at 110° C., and the moisture was sufficiently removed. The sample after the pretreatment was allowed to stand still in a desiccator, and was allowed to stand for 16 hours or more under the conditions of a temperature of 25° C. and a relative humidity of 80%, and thus a hydration treatment was performed to allow the sample to adsorb the moisture to a saturation level. The mass of the sample after the hydration treatment (X1) was measured. Moreover, the sample after the hydration treatment was heat-treated in the atmosphere under the condition of 900° C., for 1 hour, to remove the moisture sufficiently. The mass of the sample after the heat treatment (X2) was measured. With the values of X1 and X2, the amount of the moisture adsorbed per 100 g of the sample (hereinafter, the unit "g/100 g-agent" is used) was determined by the following formula (3).

[Formula 3]

$$\text{Amount of Moisture adsorbed by sample (g/100 g-agent)} = (X1-X2)/X2 \times 100 \tag{3}$$

The amount of the moisture adsorbed by sample obtained by the formula (3) was substituted into the formula (1), and thus the zeolite purity was calculated.

<BET Specific Surface Area>

A BET specific surface area was measured by using a common BET specific surface area measurement device (device name: BELSORP 28SA, manufactured by BEL Japan, Inc.). The adsorption isotherm was determined by setting the adsorption temperature at the liquid nitrogen temperature (−196° C.). The BET specific surface area was calculated from the nitrogen adsorption capacity in the range corresponding to the relative pressures of 0 to 0.1 in the obtained adsorption isotherm.

The sample was crushed and sized to have an aggregation diameter of 0.5 mm to 1 mm, and then pretreated by heating at 350° C. for 2 hours under vacuum.

<Amount of Silver Supported, and Measurement of Composition>

A molded body sample was dissolved in an acid to prepare a solution for measurement. The concentrations of the metal ions in the solution for measurement were measured by the ICP method. For the measurement, a common ICP-AES (device name: OPTIMA3000DV, manufactured by Perkin-Elmer Inc.) was used.

The concentrations of silicon, aluminum, alkali metals and silver in the sample for measurement were analyzed. The contents of the silicon, aluminum, alkali metals and silver were measured, and the molar ratio Si/Al$_2$, the molar ratio Na/Al, and the molar ratio Ag/Al in the sample were determined. In addition, the amounts of the silicon, aluminum, alkali metals, and silver in terms of oxides thereof were culculated, and from the sum of these amounts, the total amount (mass %) of SiO$_2$, Al$_2$O$_3$, Na$_2$O, and Ag$_2$O was culculated. Further, from the concentration of silver, the amount of silver supported was determined.

<Proportions of Silver Species>

The states of silver (silver species) in the molded body were measured by the ultraviolet-visible spectrometry. Specifically, an ultraviolet-visible absorption spectrometry was performed under the following conditions by using an automatic recording spectrophotometer (device name: UV-3100, manufactured by Shimadzu Corporation) equipped with an integrating sphere accessory device (device name: ISR-3100, manufactured by Shimadzu Corporation) in the sample chamber.

TABLE 1

| Measurement condition | Diffusion reflection method |
|---|---|
| Scanning speed: | 200 nm/min |
| Slit width | 5.0 nm |
| Baseline correction | Barium sulfate powder |
| Measurement wavelength range | 210-700 nm |

The obtained UV-VIS pattern was subjected to a waveform separation. In the UV-VIS pattern after the waveform separation, a peak having a peak top at a wavelength of 210 nm or more and 240 nm or less was identified as the peak of the silver ion, a peak having a peak top at a wavelength of more than 240 nm and 350 nm or less was identified as the peak of the silver cluster, and a peak having a peak top at a wavelength of more than 350 nm and 700 nm or less was identified as the peak of the metal silver. From the peak areas of the obtained respective peaks, the silver proportions contained in the silver ions ($Ag_{(ion)}$), the silver clusters ($Ag_{(clus)}$), and the metal silver ($Ag_{(metal)}$)) were determined.

<Contents of Silver Species>

The contents of respective silver species in the measurement sample were calculated from the amount of silver supported determined by the ICP measurement, and the proportions of respective silver species determined by the UV-VIS measurement.

<Particle Size>

The average particle size of the zeolite fine particles were determined by randomly extracting 30 independent smallest unit of particles having a particle size of 1.5 μm or less, that are identifiable in a SEM image at a measurement magnification of 10,000, measuring the sizes of the extracted particles, and calculating the average size of the measured sizes, which was used as the average particle size of the zeolite fine particles.

In addition, randomly extracted were 30 independent particles identifiable in a SEM image at a measurement magnification of 2,000, the sizes of the extracted particles were measured, the average size of the measured sizes was determined, and the determined average size was used as the average particle size of the zeolite powder.

<Particle Size Distribution Measurement>

In a mortar, 5 g of a molded body was crushed for 10 minutes, and then sieved with a sieve having an opening of 200 μm. In 50 ml of pure water, 0.5 g of the crushed sample having passed through the sieve was added to prepare a slurry, and the prepared slurry was then subjected to ultrasonic dispersion for 2 minutes with a homogenizer. Subsequently, the particle size distribution of the slurry solution was measured with a Microtrac particle size distribution analyzer (manufactured by Nikkiso Co., Ltd.).

<Preparation of Simulated Contaminated Water>

By adopting the following procedures, simulated contaminated water containing nonradioactive iodine, simulating the contaminated water of Fukushima Daiichi Nuclear Power Station was prepared.

First, by using an ordinary salt (Nami Shio) manufactured by Diasalt Co., Ltd., an aqueous solution was prepared so as to have a salt concentration of 0.3%. To the prepared aqueous solution, cesium chloride was added so as for the cesium concentration to be 1 mg/L, strontium chloride was added so as for the strontium concentration to be 10 mg/L, magnesium chloride was added so as for the magnesium concentration to be 400 mg/L, and calcium chloride was added so as for the calcium concentration to be 400 mg/L, respectively. Then, to the resulting aqueous solution, sodium iodide was added in an amount so as for the iodine concentration to be 1 mg/L, and thus a simulated contaminated water containing, in addition to iodide ions, as concomitant ions, high concentrations of chloride ions, cesium ions, strontium ions, magnesium ions, calcium ions, and sodium ions was prepared.

Example 1

<Preparation of Silver-Containing Zeolite Molded Body>

Figure 9:
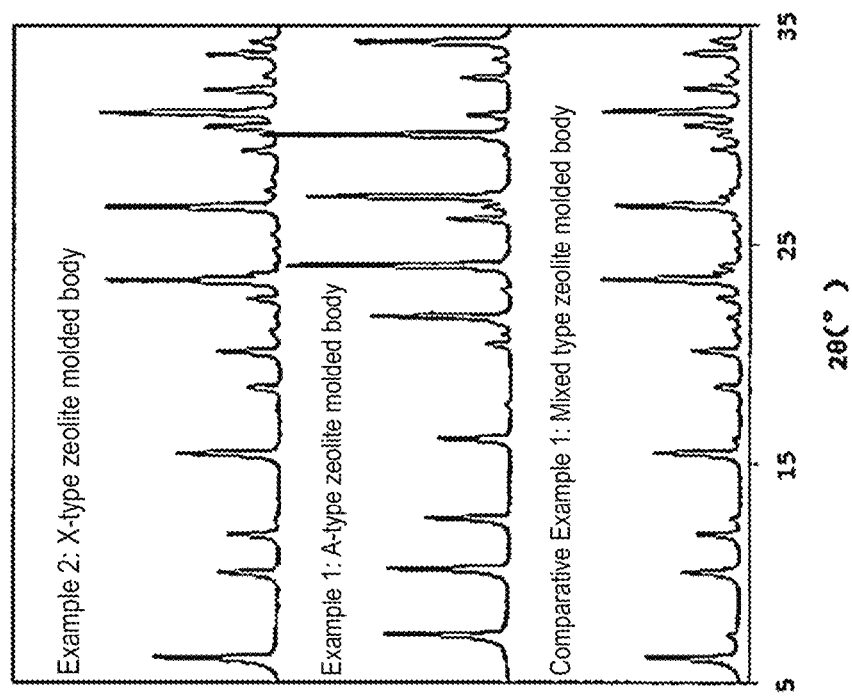
FIG. 9 is the XRD charts of the zeolite molded bodies of Example 1, Example 2 and Comparative Example 1.

100 parts by mass of a commercially available A-type zeolite powder (A-4, manufactured by Tosoh Corporation), 20 parts by mass of kaolin clay, and 3 parts by mass of carboxymethyl cellulose were kneaded while adding water to obtain a mixture. The water content of the obtained mixture was 45 mass %. The mixture was extruded to obtain a plurality of columnar zeolite molded bodies having a diameter of 1.5 mm and a length of 1 mm to 5 mm. The obtained molded bodies were dried at 100° C. overnight, and then fired under air flow at 600° C. for 3 hours. The molded bodies after firing were washed with pure water at room temperature, then 6 mass % of NaOH aqueous solution was allowed to circulate and flow at a flow rate of 235 mL/min, and thus the kaolin clay was converted into zeolite. The circulation flowing was performed at 40° C. for 1 hour, and then performed at 80° C. for 5 hours. The molar ratio $Si/Al_2$ in the obtained A-type zeolite molded body was 2.5. The zeolite purity of the obtained molded body was 98.1 mass %, and thus the obtained molded body was verified as a binderless molded body. In addition, by XRD measurement, it was verified that the zeolite structures other than the A-type zeolite were not included (FIG. 9).

Next, 40 g of the columnar binderless molded body (bodies) were immersed in a silver nitrate aqueous solution (15.1 mass %), and an ion exchange treatment was performed while stirring at 50° C. for 4 hours. The vicinity of the liquid surface of the silver nitrate aqueous solution was stirred at a rate of 100 rpm, but the flowage of the molded bodies was not verified during the ion exchange treatment.

Figure 2:
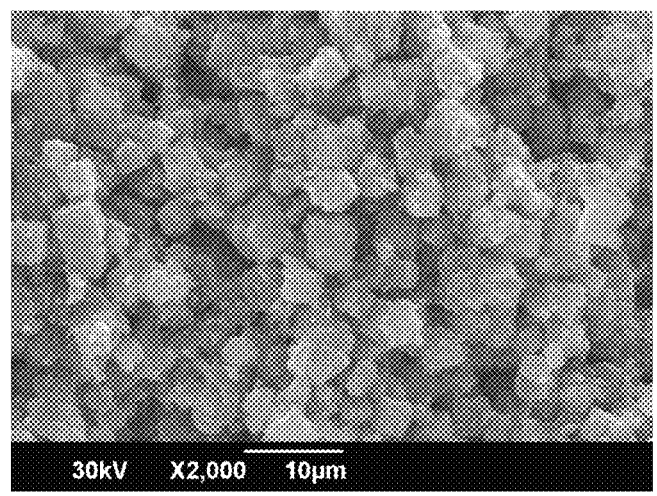
FIG. 2 is a SEM image of the silver-containing A-type zeolite molded body prepared in Example 1, at a magnification of 2,000.

After the ion exchange treatment, the molded bodies were washed with sufficient water, dried at 90° C. for 12 hours, and thus binderless A-type zeolite molded bodies having a silver content of 30 mass % (silver ion: 9.9 mass %) were obtained. The binderless A-type zeolite molded bodies were crushed and classified, and sized to have a particle size of 300 μm to 600 μm. The SEM images of the silver-containing A-type zeolite molded body are shown in FIGS. 1 and 2. It was verified from FIG. 1 that the A-type zeolite fine particles are present on the surface of the silver-containing binderless A-type zeolite molded bodies, the average particle size of the A-type zeolite fine particles was 0.39 μm, and also verified from FIG. 2 that the average particle size of the zeolite powder in the binderless A-type zeolite molded bodies was 4.2 μm. In addition, impurities other than the A-type zeolite were not identified. The molar ratio $Si/Al_2$ was 2.5, the molar ratio Na/Al was 0.42, the molar ratio Ag/Al was 0.58, the molar ratio (alkali metals+Ag)/Al was 1.0, the amount of Ag supported was 30 mass %, and the total amount of $SiO_2$, $Al_2O_3$, $Na_2O$, and $Ag_2O$ was 99 mass %. The abundance percentages of the silver ions, silver clusters and metal silver are shown in Table 2.

In the same manner as described above, by using a silver nitrate aqueous solution (17.7 mass %) prepared by dissolving 30.7 g of silver nitrate in 142 g of pure water, a binderless A-type zeolite molded body having a silver content of 35 mass % (silver ions: 11.9 mass %) was obtained. In the zeolite molded body, impurities other than the A-type zeolite were not identified. The molar ratio $Si/Al_2$ was 2.5, the molar ratio Na/Al was 0.29, the molar ratio Ag/Al was 0.71, the molar ratio (alkali metals+Ag)/Al was 1.0, the amount of silver supported was 35 mass %, and the total amount of $SiO_2$, $Al_2O_3$, $Na_2O$, and $Ag_2O$ was 99 mass %. The abundance percentages of the silver ions, silver clusters and metal silver are shown in Table 3.

As a control, a commercially available binder A-type zeolite molded body was immersed in a silver nitrate aqueous solution; an ion exchange treatment, washing, drying, crushing and classification were performed in the same manner as described above, and a binder A-type zeolite molded body having a silver content of 36 mass % was obtained. As the silver nitrate aqueous solution, a silver nitrate aqueous solution (22.0 mass %) prepared by dissolving 40.0 g of silver nitrate in 142 g of pure water was used.

TABLE 2

Abundance percentages of Ag species in a binderless A-type zeolite having a silver content of 30 mass %

| $Ag_{(ion)}$ | | $Ag_{(clus)}$ | | $Ag_{(metal)}$ | |
|---|---|---|---|---|---|
| Proportion (%) | Mass (mass %) | Proportion (%) | Mass (mass %) | Proportion (%) | Mass (mass %) |
| 33 | 9.9 | 61 | 18.3 | 6 | 1.8 |

TABLE 3

Abundance percentages of Ag species in a binderless A-type zeolite having a silver content of 35 mass %

| $Ag_{(ion)}$ | | $Ag_{(clus)}$ | | $Ag_{(metal)}$ | |
|---|---|---|---|---|---|
| Proportion (%) | Mass (mass %) | Proportion (%) | Mass (mass %) | Proportion (%) | Mass (mass %) |
| 34 | 11.9 | 60 | 21.0 | 6 | 2.1 |

<Comparison of Iodine Adsorption Performance>

Figure 3:
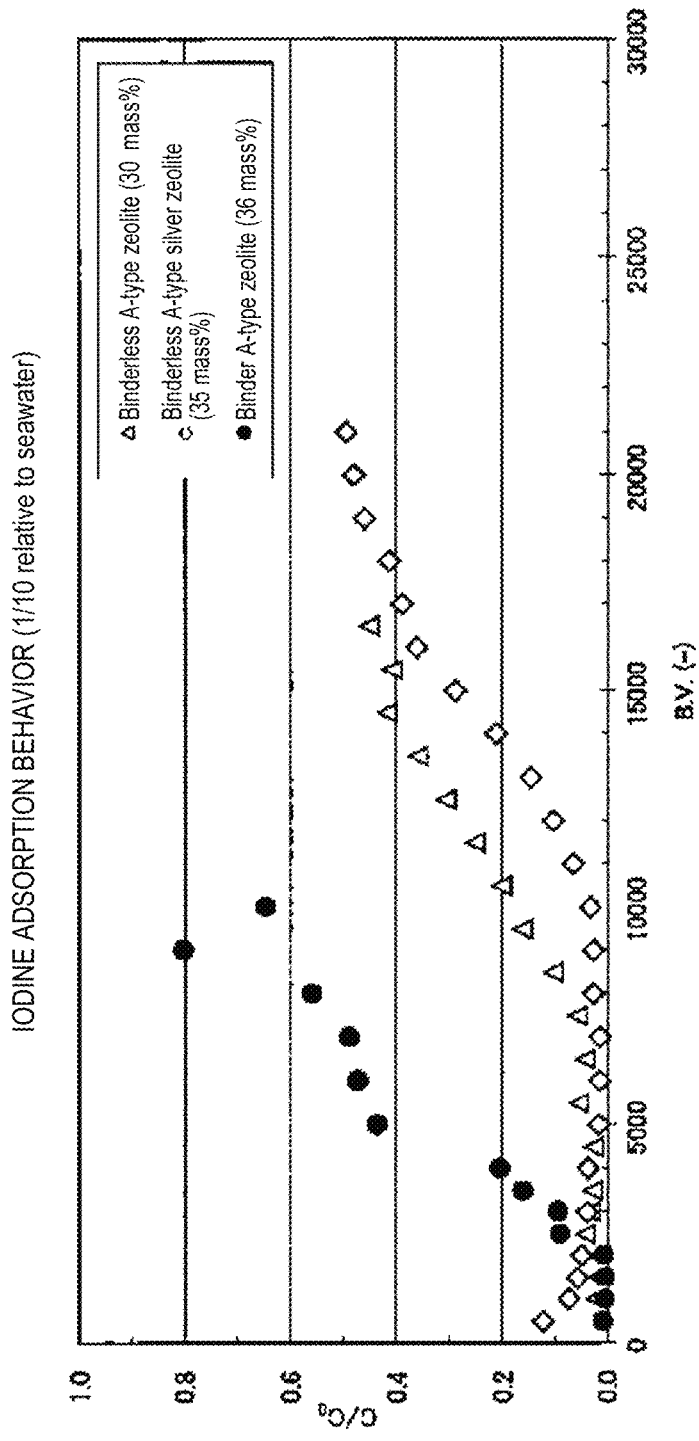
FIG. 3 is a graph showing the iodine adsorption behavior of the adsorbent used in Example 1.

A glass column having an inner diameter of 16 mm was packed with a silver-containing zeolite molded body having a particle size of 300 μm to 600 μm, so as for the layer height to be 10 cm. The simulated contaminated water was passed through the column at a flow rate of 67 mL/min, the column outlet water was periodically sampled, and the iodine concentration was measured. The quantitative analysis of iodine was performed by using an ICP-MS (Agilient 7700x). The removal performance of iodine is shown in FIG. 3. In FIG. 3, the horizontal axis is the B.V. representing the ratio of the volume of the simulated contaminated water passing through the column to the volume of the adsorbent; the vertical axis represents the value obtained by dividing the iodine concentration at the column outlet by the iodine concentration at the column inlet. As can be seen from FIG. 3, as compared with the binder A-type silver-containing zeolite molded body, the binderless A-type silver-containing zeolite molded body is higher in the iodine adsorption performance even when the silver content is small. In other words, it has been able to be verified that the adsorbent for iodine composed of the silver-containing zeolite molded body of the present invention is higher in the capability of adsorbing iodine per unit volume.

In addition, it has also been able to be verified that the adsorbent for iodine of the present invention, which consists of the silver-containing zeolite molded body, exhibits a satisfactory iodine adsorption performance from the simulated contaminated water containing, in addition to iodide ions, as concomitant ions, high concentrations of chloride ions, cesium ions, strontium ions, magnesium ions, calcium ions, and sodium ions.

Example 2

<Preparation of Silver-Containing Zeolite Molded Body>

100 parts by mass of a commercially available X-type zeolite powder (F-9, manufactured by Tosoh Corporation), 20 parts by mass of kaolin clay, and 3 parts by mass of carboxymethyl cellulose were added, the resulting mixture was kneaded while water was being added to obtain a mixture. The water content of the obtained mixture was 45 mass %. The mixture was extruded to obtain a plurality of columnar molded bodies having a diameter of 1.5 mm and a length of 1 mm to 5 mm. The obtained molded bodies were dried at 100° C. overnight, and then fired under air flow at 600° C. for 3 hours. The molded bodies after firing were washed with pure water at room temperature, then an aqueous solution containing 8.1 mass % NaOH and 1 mass % of $SiO_2$ was allowed to circulate and flow at a flow rate of 235 mL/min, and thus the kaolin clay was converted into zeolite. The circulation flowing was performed at 40° C. for 1 hour, and then performed at 90° C. for 7 hours. The molar ratio $Si/Al_2$ in the obtained X-type zeolite molded body was 2.8. The zeolite purity of the obtained molded body was 97.7 mass %, and thus the obtained molded body was verified as a binderless molded body. In addition, by XRD measurement, it was verified that the zeolite structures other than the X-type zeolite were not included (FIG. 9).

Next, 40 g of the columnar molded body (bodies) were immersed in an 8.9 mass % silver nitrate aqueous solution (prepared by dissolving 14.0 g of silver nitrate in 142 g of pure water), and an ion exchange treatment was performed while stirring at 50° C. for 4 hours. The vicinity of the liquid surface of the silver nitrate aqueous solution was stirred at a rate of 100 rpm, but the flowage of the molded bodies was not verified during the ion exchange treatment.

Figure 4:
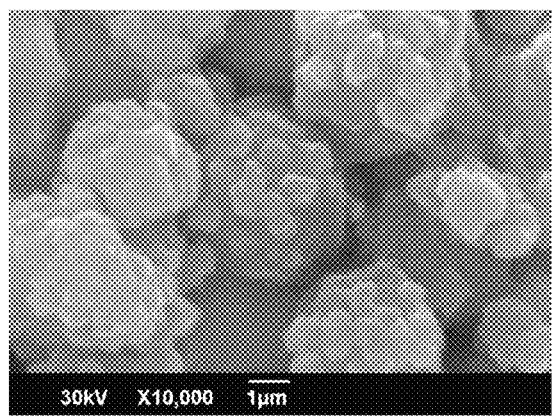
FIG. 4 is a SEM image of the silver-containing X-type zeolite molded body prepared in Example 2, at a magnification of 10,000.
Figure 5:
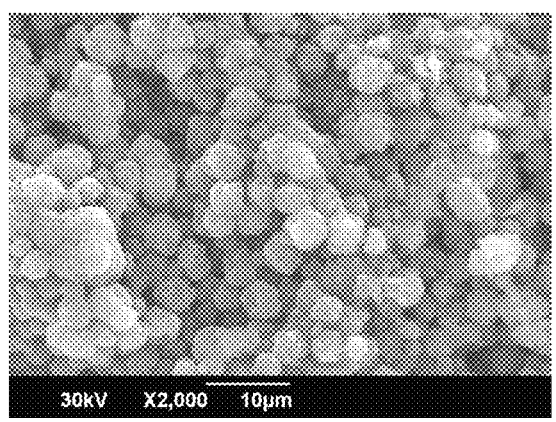
FIG. 5 is a SEM image of the silver-containing X-type zeolite molded body prepared in Example 2, at a magnification of 2,000.

After the ion exchange treatment, the molded bodies were washed with sufficient water, dried at 90° C. for 12 hours, and thus silver-containing binderless X-type zeolite molded bodies were obtained. The SEM images of the silver-containing X-type zeolite molded body are shown in FIGS. 4 and 5. It was verified from FIG. 4 that the X-type zeolite fine particles are present on the surface of the silver-containing binderless X-type zeolite molded bodies, the average particle size of the X-type zeolite fine particles was 0.64 μm, and also verified from FIG. 5 that the average particle size of the zeolite powder in the binderless X-type zeolite molded bodies was 4.4 μm. In addition, impurities other than the X-type zeolite were not identified. BET specific surface area was 725 m²/g, the molar ratio $Si/Al_2$ was 2.8, the molar ratio Na/Al was 0.66, the molar ratio Ag/Al was 0.34, the molar ratio (alkali metals+Ag)/Al was 1.0, the amount of Ag supported was 18 mass %, and the total amount of $SiO_2$, $Al_2O_3$, $Na_2O$, and $Ag_2O$ was 98 mass %. The abundance percentages of the silver ions, silver clusters and metal silver are shown in Table 4.

TABLE 4

Abundance percentages of Ag species in a binderless
X-type zeolite having a silver content of 18 mass %

| $Ag_{(ion)}$ | | $Ag_{(clus)}$ | | $Ag_{(metal)}$ | |
|---|---|---|---|---|---|
| Proportion (%) | Mass (mass %) | Proportion (%) | Mass (mass %) | Proportion (%) | Mass (mass %) |
| 67 | 12.1 | 30 | 5.4 | 3 | 0.5 |

The silver-containing binderless X-type zeolite molded body was crushed in a mortar so as to have an aggregation diameter of 0.1 μm to 15 μm, then the volume distribution particle size was measured. The particle size distribution of the molded body was found to be monomodal, and the volumetric average particle size (D50) was 3.7 μm. From the SEM image and the measurement of the volumetric particle size distribution, it was verified that in the binderless X-type zeolite molded body of the present Example, the zeolite fine particles were present as integrated on the surface of the zeolite coarse particles.

<Comparison of Iodine Adsorption Performance>

Figure 6:
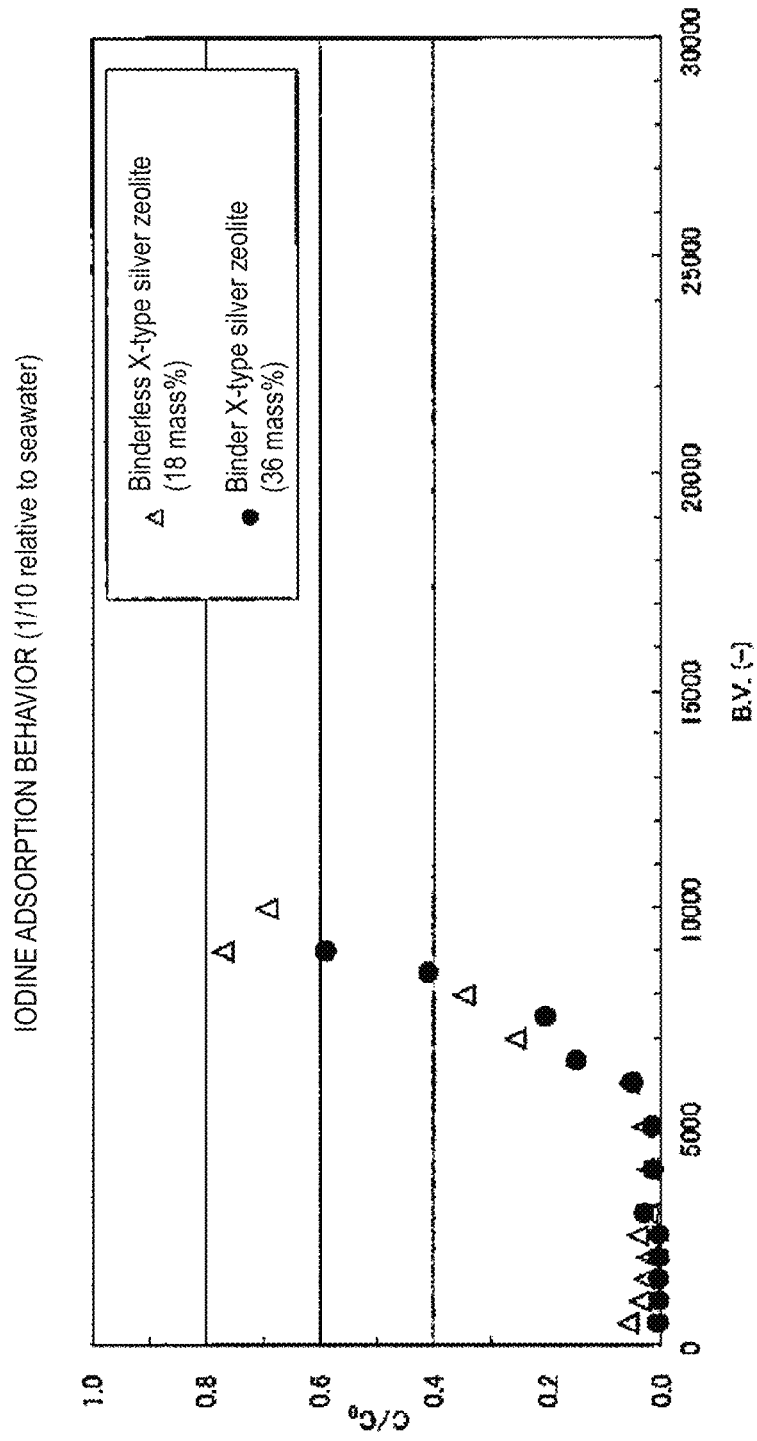
FIG. 6 is a graph showing the iodine adsorption behavior of the adsorbent used in Example 2.

By using the prepared silver-containing binderless X-type zeolite molded body having a particle size of 300 μm to 600 μm, the iodine adsorption performance was measured in the same manner as in Example 1, and the iodine adsorption performance is shown in FIG. 6, similar to FIG. 3.

As a control, a commercially available binder X-type zeolite molded body was washed with pure water at room temperature, then without performing the circulation flowing, the binder X-type zeolite molded body was immersed in a silver nitrate aqueous solution; an ion exchange treatment, washing, drying, crushing and classification were performed in the same manner as described above, a binder X-type zeolite molded body having a silver content of 36 mass % was obtained. As the silver nitrate aqueous solution, a silver nitrate aqueous solution (22.0 mass %) prepared by dissolving 40.0 g of silver nitrate in 142 g of pure water was used. The molar ratio $Si/Al_2$ in the zeolite molded body was 3.3.

As can be seen from FIG. 6, as compared with the binder X-type silver-containing zeolite molded body, the binderless X-type silver-containing zeolite molded body is higher in the iodine adsorption performance even when the silver content is small. In other words, it has been able to be verified that the adsorbent for iodine composed of the silver-containing zeolite molded body of the present invention is higher in the capability of adsorbing iodine per unit volume.

Example 3

<Preparation of Silver-Containing Zeolite Molded Body>

A silver-containing binderless A-type zeolite molded body having a silver content of 45 mass % was prepared in the same manner as in Example 1 except that a silver nitrate aqueous solution (25.1 mass %) prepared by dissolving 47.7 g of silver nitrate in 142 g of pure water was used. As the silver-containing binderless A-type zeolite molded bodies having silver contents of 30 mass % and 35 mass %, respectively, those prepared in Example 1 were used.

<Comparison of Iodine Adsorption Performance>

Figure 7:
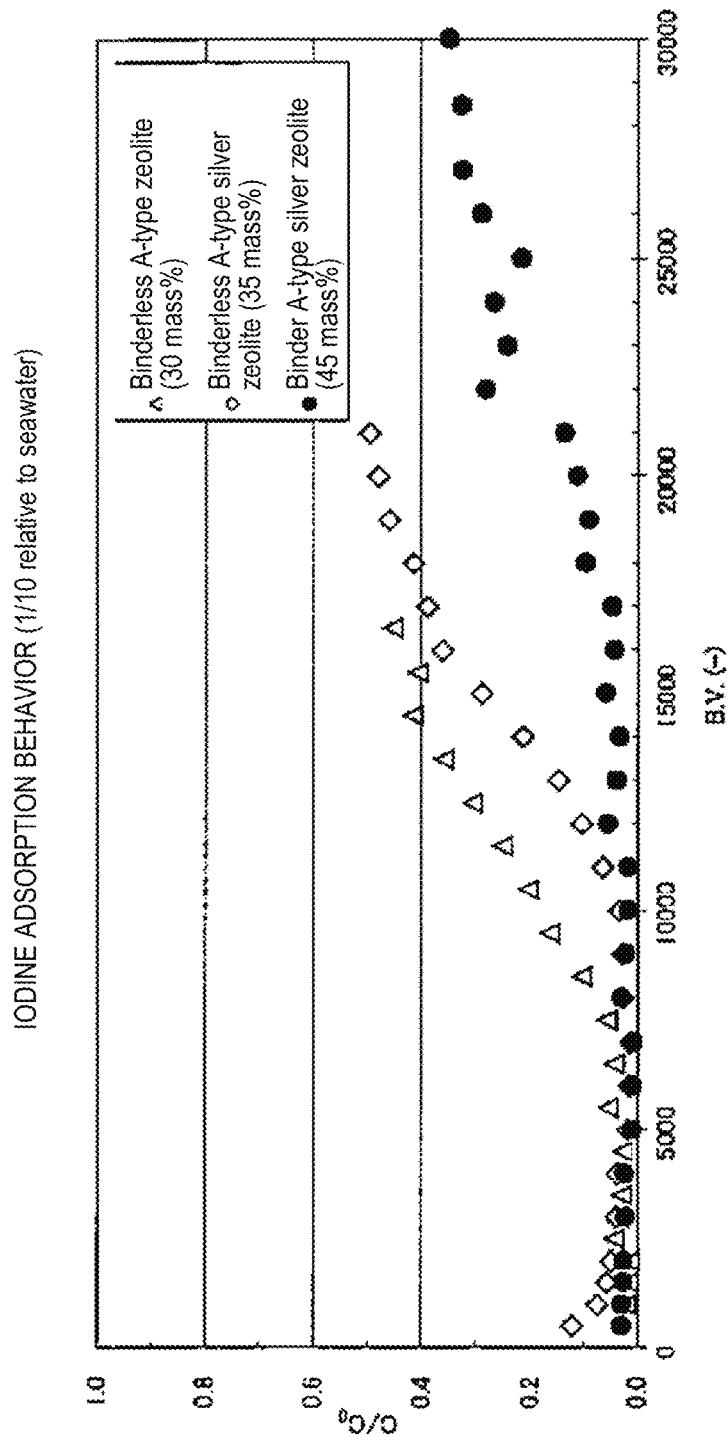
FIG. 7 is a graph showing the iodine adsorption behavior of the adsorbent used in Example 3.

By using the silver-containing binderless A-type zeolite molded bodies (particle size: 300 μm to 600 μm) having silver contents of 30 mass %, 35 mass % and 45 mass %, respectively, in the same manner as in Example 1, the iodine adsorption performances were measured in the same manner as in Example 1, and the iodine adsorption performances are shown in FIG. 7, similar to FIG. 3.

From FIG. 7, it has been able to be verified that as the silver content increases, the iodine adsorption performance is improved.

Example 4

<Preparation of Silver-Containing Zeolite Molded Body>

A silver-containing binderless X-type zeolite molded body having a silver content of 9 mass % was prepared in the same manner as in Example 2 except that a silver nitrate aqueous solution (4.7 mass %) prepared by dissolving 7.0 g of silver nitrate in 142 g of pure water was used. In addition, a silver-containing binderless X-type zeolite molded body having a silver content of 34 mass % was prepared in the same manner as in Example 2 except that a silver nitrate aqueous solution (17.4 mass %) prepared by dissolving 29.9 g of silver nitrate in 142 g of pure water was used. BET specific surface area was 570 $m^2/g$, the molar ratio $Si/Al_2$ was 2.8, the molar ratio Na/Al was 0.27, the molar ratio Ag/Al was 0.73, the molar ratio (alkali metals+Ag)/Al was 1.0, the amount of Ag supported was 34 mass %, and the total amount of $SiO_2$, $Al_2O_3$, $Na_2O$, and $Ag_2O$ was 99 mass %. The abundance percentages of the silver ions, silver clusters and metal silver are shown in Table 5.

TABLE 5

Abundance percentages of Ag species in a binderless
X-type zeolite having a silver content of 34 mass %

| $Ag_{(ion)}$ | | $Ag_{(clus)}$ | | $Ag_{(metal)}$ | |
|---|---|---|---|---|---|
| Proportion (%) | Mass (mass %) | Proportion (%) | Mass (mass %) | Proportion (%) | Mass (mass %) |
| 75 | 25.5 | 23 | 7.8 | 2 | 0.7 |

In addition, a silver-containing binderless X-type zeolite molded body having a silver content of 42 mass % was prepared in the same manner as in Example 2 except that a silver nitrate aqueous solution (23.4 mass %) prepared by dissolving 43.3 g of silver nitrate in 142 g of pure water was used. As the silver-containing binderless X-type zeolite molded body having a silver content of 18 mass %, that prepared in Example 2 was used.

<Comparison of Iodine Adsorption Performance>

Figure 8:
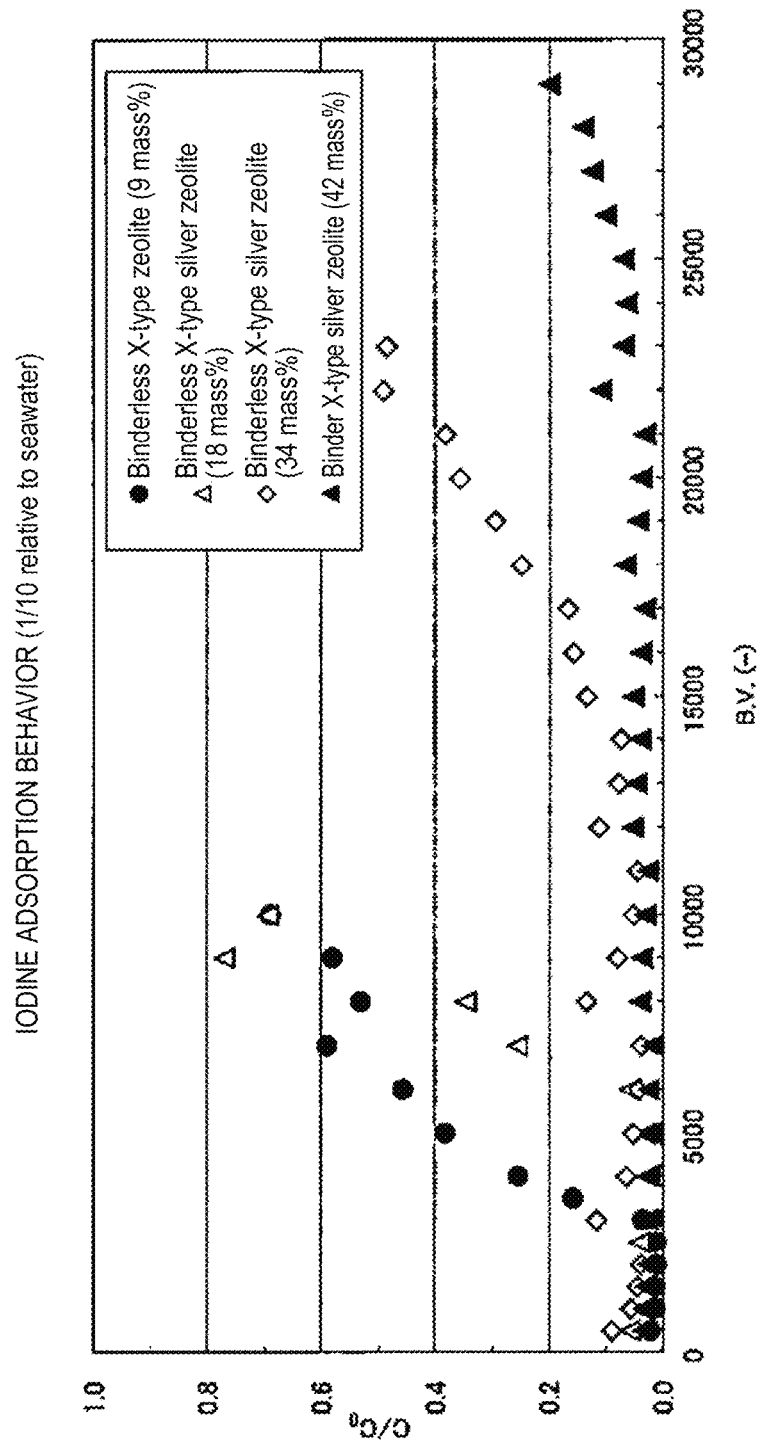
FIG. 8 is a graph showing the iodine adsorption behavior of the adsorbent used in Example 4.

By using the silver-containing binderless X-type zeolite molded bodies (particle size: 300 μm to 600 μm) having silver contents of 9 mass %, 18 mass %, 34 mass % and 42 mass %, respectively, in the same manner as in Example 1, the iodine adsorption performances were measured in the same manner as in Example 1, and the iodine adsorption performances are shown in FIG. 8, similar to FIG. 3

From FIG. 8, it has been able to be verified that as the silver content increases, the iodine adsorption performance is improved.

Comparative Example 1

A commercially available X-type zeolite powder (F-9, manufactured by Tohsoh Corporation) was fired in the same manner as in Example 2, and thus a molded body was obtained. A zeolite molded body was obtained in the same manner as in Example 2 except that the molded body was washed with pure water at room temperature, then an aqueous solution containing 6% by mass of NaOH was allowed to circulate and flow at a flow rate of 235 mL/min, at 40° C. for 1 hour and then at 80° C. for 5 hours, and thus the kaolin clay was converted into an A-type zeolite.

From the analysis results of XRD, it was verified that an X-type zeolite and an A-type zeolite were included (FIG. 9). In addition, because the moisture adsorption amount of the zeolite molded body including the X-type zeolite and the A-type zeolite was 33.4 (g/100 g-agent), the moisture adsorption amount of the X-type zeolite molded body was 34.2 (g/100 g-agent) from the result of Example 2, and the moisture adsorption amount of the A-type zeolite molded body was 26.5 (g/100 g-agent) from the result of Example 1, the present zeolite molded body was verified to be a molded body including the X-type zeolite molded body in a proportion of 89.6% and the A-type zeolite molded body in a proportion of 10.4%.

A silver-containing binder zeolite molded body having a silver content of 34 mass % was prepared by performing an ion exchange treatment of silver in the same manner as in Examples 1 and 2, except that a 17.4 mass % silver nitrate aqueous solution was used. The molar ratio (alkali metals+ Ag)/Al was 1.0, the amount of silver supported was 34 mass %, and the total amount of $SiO_2$, $Al_2O_3$, $Na_2O$, and $Ag_2O$ was 99 mass %. The abundance percentages of the silver ions, silver clusters and metal silver are shown in Table 6.

TABLE 6

Abundance percentages of Ag species in a binderless X-A mixed type zeolite having a silver content of 34 mass %

| $Ag_{(ion)}$ | | $Ag_{(clus)}$ | | $Ag_{(metal)}$ | |
|---|---|---|---|---|---|
| Proportion (%) | Mass (mass %) | Proportion (%) | Mass (mass %) | Proportion (%) | Mass (mass %) |
| 19 | 65.0 | 74 | 25.2 | 7 | 2.4 |

As compared with the binderless A-type zeolite molded body of Example 1, and the binderless X-type zeolite molded bodies of Examples 2 and 3, the proportion of silver ion of the comparative example was lower, the proportions of the silver cluster and the metal silver were higher, in particular, the proportion of the silver cluster was extremely higher, and thus, the dispersibility was poor. It is conceivable that when different zeolite species are present in a mixed manner, the zeolite species, that are easily exchangeable with silver, preferentially adsorb silver, and accordingly the aggregation of silver tends to proceed.

What is claimed is:

1. A treatment method of a radioactive iodine-containing fluid, comprising passing the radioactive iodine-containing fluid through an adsorbent for iodine consisting of a silver-containing binderless zeolite molded body having a silver content of 50 mass % or less, to adsorb the radioactive iodine on the adsorbent for iodine, wherein the binderless zeolite molded body constituting the adsorbent for iodine is either a binderless A-type zeolite molded body alone or a binderless X-type zeolite molded body alone, and wherein the binderless zeolite molded body includes a zeolite powder and zeolite fine particles wherein the zeolite powder has on a surface thereof the zeolite fine particles, and an average particle size of the zeolite powder is 2 μm or more and 8 μm or less wherein the average particle size of the zeolite powder is determined by measuring the size of randomly extracting 30 or more of independent smallest unit of particles having a particle size of 1.5 μm or less identifiable in a scanning electron microscope image at a measurement magnification of 10,000 to 15,000, and an average particle of the zeolite fine particles is 0.2 μm or more and 1.5 μm or less wherein the average particle size of the zeolite fine particles is determined by measuring the size of randomly extracting 30 or more of independent particles identifiable in a scanning electron microscope image at a measurement magnification of 1,500 to 3,000.

2. The treatment method of a radioactive iodine-containing fluid according to claim 1, wherein the adsorbent for iodine is consisting of a silver-containing binderless zeolite molded body containing 5 mass % or more of silver ions.

3. The treatment method of a radioactive iodine-containing fluid according to claim 1, wherein the radioactive iodine-containing fluid is a liquid, and the silver-containing binderless zeolite molded body is in a particle form having a particle size falling within a range from 30 μm to 1500 μm.

4. The treatment method of a radioactive iodine-containing fluid according to claim 2, wherein the radioactive iodine-containing fluid is a liquid, and the silver-containing binderless zeolite molded body is in a particle form having a particle size falling within a range from 30 μm to 1500 μm.

* * * * *